Dec. 26, 1950 P. B. KAIL 2,535,213
STEREOSCOPIC PLOTTING MACHINE
Filed June 27, 1947 2 Sheets-Sheet 1
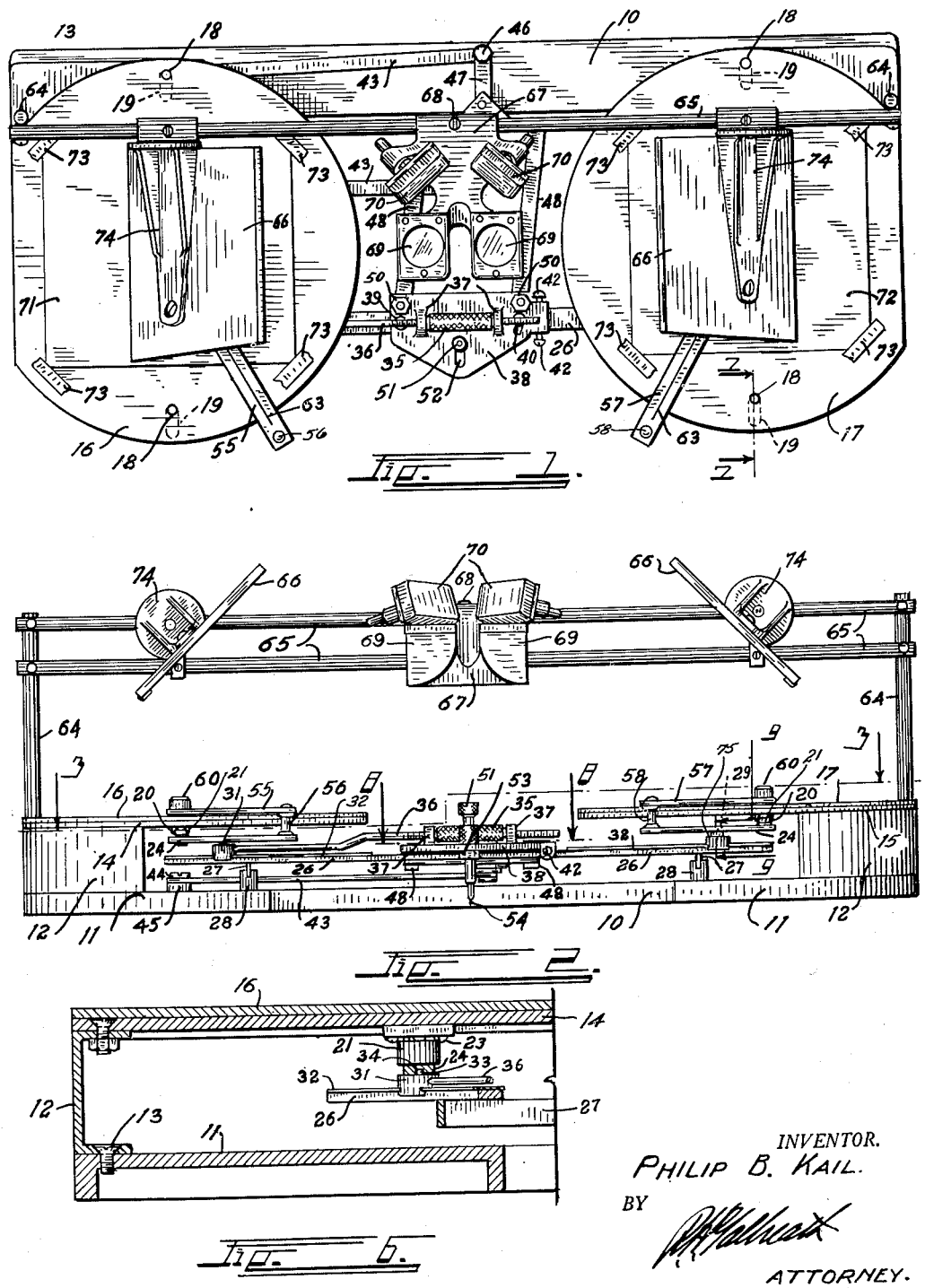
INVENTOR.
PHILIP B. KAIL.
BY
ATTORNEY.

Dec. 26, 1950 P. B. KAIL 2,535,213
STEREOSCOPIC PLOTTING MACHINE
Filed June 27, 1947 2 Sheets-Sheet 2
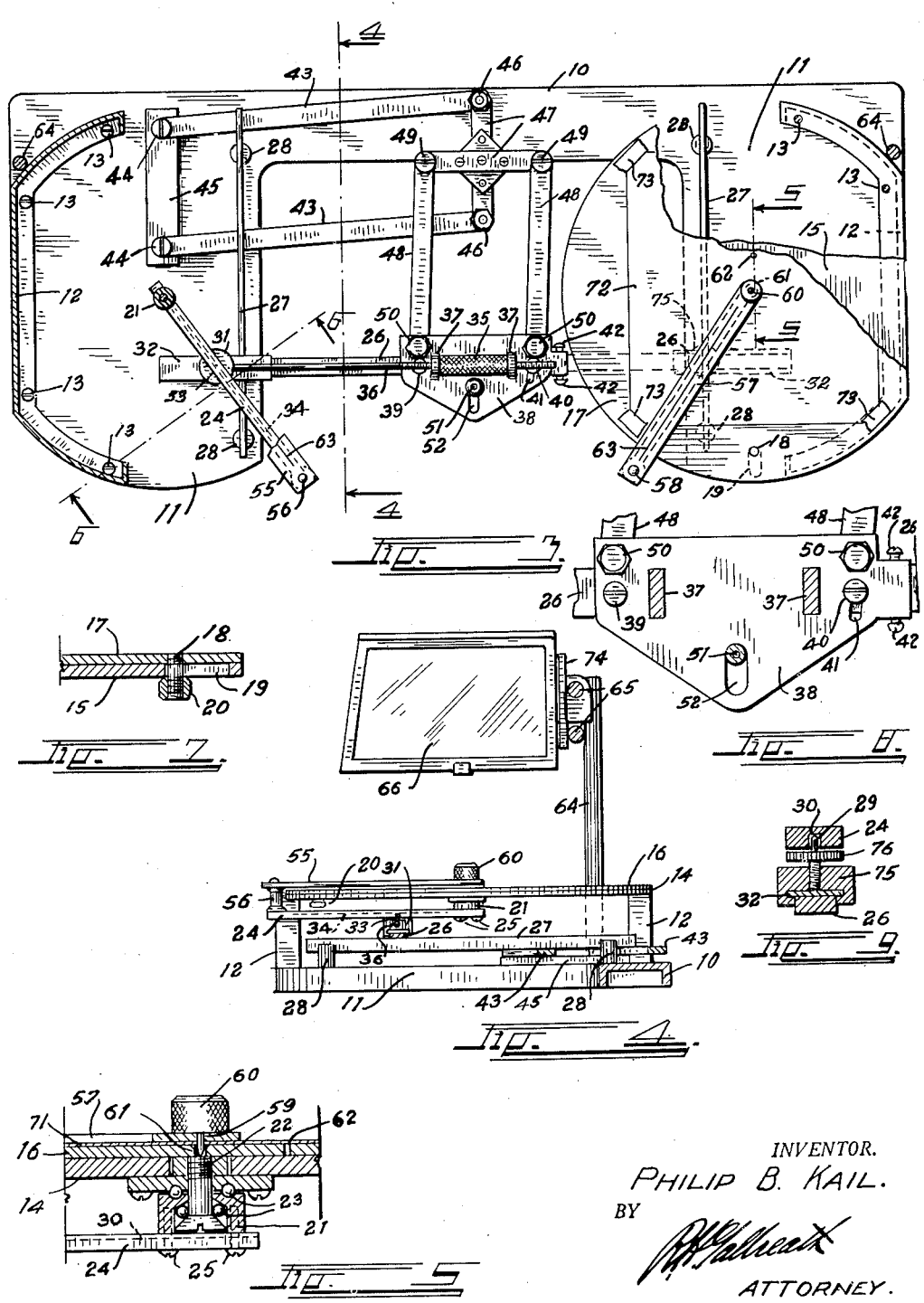
INVENTOR.
PHILIP B. KAIL.
BY
ATTORNEY.

Patented Dec. 26, 1950

2,535,213

UNITED STATES PATENT OFFICE 2,535,213

STEREOSCOPIC PLOTTING MACHINE

Philip B. Kail, Denver, Colo.

Application June 27, 1947, Serial No. 757,531

14 Claims. (Cl. 33—20)

This invention relates to a planimetric plotting device, that is, an instrument for accurately laying out a map from stereoscopically spaced aerial photographs.

The principal object of the invention is to provide a simple, rapid, and inexpensive device which can be used by a relatively unskilled operator for accurately transferring planimetric detail from aerial photographs directly onto a map base, with all distortion due to differences in ground elevations automatically removed.

Vertical aerial photographs contain a wealth of detail of great value to any maker or user of maps. For accurate use, however, some system must be employed to remove the distortion of this detail and to plot it accurately in its proper place. There are three types of distortion: (1) perspective or difference in scales within the photo due to differences in elevation of the ground; (2) differences in scale between photographs, due to loss or gain of altitude of the camera; and (3) tip and tilt, due to movement of the camera from the vertical.

Tip and tilt distortions are critical in topographic work, but in planimetric work the displacement is so small that it may be ignored. Scale differences, however, due to differences in elevation or relief in the details of the terrain are very significant, and prior plotters of the reflecting projector type require constant correction during the plotting. The principal advantage attained by this invention is the automatic elimination of scale distortions due to differences in ground elevations, so that the results will be accurate to the map scale without further adjustments.

Scale differences between the photographic and the plotting scale, and between the two stereoscopically related photographs, must also be accurately adjusted. Another object of this invention is to provide accurate and easily manipulated means in a planimetric plotter for correcting differences in scale, both between the photographs and the map and between the two photographs themselves, so that detail transferred from the photographs to the map will be accurately positioned on the latter.

A further object is to provide a plotting device of the above characteristics which will be light in weight and easily portable so that it may be easily and accurately positioned over any desired portions of the base map sheet.

Probably the oldest and best known method of plotting detail on a map is by visual triangulation from two or more fixed control stations upon the ground. Lines are radiated from these fixed stations to the various detail of the area, either by means of plane tables or horizontal transit angles. The given detail is located on the map at the intersection of the radial lines drawn to that detail from the control stations.

This invention employs this well-known radial line principle for locating map points from selected control stations in spaced-apart relation on a stereoscopic image of stereoscopically related photographs.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top plan view of the improved planimetric plotting device;

Fig. 2 is a front view thereof;

Fig. 3 is a horizontal, sectional view, taken on the line 3—3, Fig. 2;

Fig. 4 is a vertical, cross-sectional view taken on the line 4—4, Fig. 3;

Fig. 5 is an enlarged, detail section, taken on the line 5—5, Fig. 3;

Fig. 6 is a similarly enlarged, detail section, taken on the line 6—6, Fig. 3;

Fig. 7 is a similar section, taken on the line 7—7, Fig. 1;

Fig. 8 is an enlarged detail section, taken on the line 8—8, Fig. 2, showing a pencil plate employed in the device; and Fig. 9 is a detail, sectional view, taken on the line 9—9, Fig. 2.

The improved radial planimetric plotting device is mounted upon a base plate 10, which is substantially U-shaped in plan, terminating in relatively flat pad portions 11.

An arcuate supporting wall 12 is secured by means of suitable screws 13 to the base plate 10 about the outer edge of each pad portion 11. The supporting walls 12 support fixed, horizontal table plates 14 and 15 which are secured to the walls along the upper edges of the latter in parallel, spaced relation to the base plate 10.

The left table plate 14 supports a slidable, circular photo plate 16, and the right table plate 15 supports a similar slidable photo plate 17. The photo plates 16 and 17 are provided with downwardly extending studs 18, which enter and travel in elongated slots 19 formed in the plates 14 and 15. The slots 19 are aligned with each other in each table plate, and the slots in the two plates are in parallel relation so that the photo plates 16 and 17 may be moved forwardly and back in parallel relation the pre-set length of the slots 19.

The forward studs 18 in each of the photo plates are threaded to receive lock nuts 20 (see Fig. 7) which can be clamped against the bottom of the table plates to lock the photo plates in either extremity of the slot 19.

A rotatable trunnion bearing 21 is secured beneath the center of each table plate by means of an axis bolt 22. The trunnion bearings 21 are separated from the table plates and from the axis bolts by means of anti-friction bearings 23, so that the trunnion bearings 21 may freely rotate without looseness.

A radial lever 24 is secured at its one extremity to each of the trunnion bearings 21 by means of suitable attachment screws 25. The other extremity of each of the levers 24 extends outwardly beyond the periphery of its table plate.

The levers 24 are swung from the movements of a cross bar 26. The cross bar 26 slidably rests upon two parallel horizontal track members 27, there being one track member supported upon suitable posts 28 along the inner edge of each pad portion 11. The cross bar 26 carries, adjacent one of its extremities, a pivot pin block 75 which is slidably fitted over a dovetailed top plate 32, there being one of the latter plates 32 secured upon and projecting beyond the sides of the bar 26 adjacent each extremity of the latter. The block 75 can be set in any desired position along the bar 26 by means of a set screw 76, the head of which is shaped to form a pivot pin 29 which extends upwardly into an elongated groove 30 extending longitudinally of the right-hand lever 24.

A movable pin block 31 is mounted on the other extremity of the bar 26. The block 31 is slidably fitted over the other dovetailed top plate 32 adjacent the other extremity of the bar 26 so that the block 31 may be moved longitudinally of the former. The block 31 carries an adjustable pivot pin 33 which travels in a longitudinal groove 34 in the bottom of the left-hand lever 24.

The distance between the pivot pins 29 and 33 may be adjusted by rotation of an elongated nut 35 which is threaded on an adjusting rod 36 extending from the block 31. The rod 36 extends through supporting ears 37, which prevent endwise movement of the nut 35. The ears 37 are formed on a pencil plate 38. The pencil plate 38 is secured at one extremity to the cross bar 26 by means of a pivot screw 39. A clamp screw 40 is threaded into the cross bar 26 and extends through an arcuate slotted hole 41 in the other extremity of the plate 38, whereby it may be set in any desired position relative to the cross bar 26. The relative position is adjusted by means of adjusting screws 42 which engage the sides of the bar 26 to bring the cross bar 26 into parallel alignment with the longitudinal axis intersecting the centers of the trunnion bearings 21.

This alignment is maintained by means of parallel linkage. This linkage consists of a first pair of swinging links 43 which are hingedly mounted upon hinge screws 44 extending from a fixed boss 45 upon the left pad portion 11. The screws 44 are in alignment with the lateral center line of the table plate 14. The links 43 are similar in length and terminate in hinge screws 46 which hingedly secure them to a cross frame 47. A second pair of parallel links 48 extend from hinge screws 49 on the frame 47 to hinge screws 50 on the pencil plate 38.

Thus, it can be seen that the bar 26 may be freely moved in all directions on the track members 27. It can also be seen that, when once set in parallel alignment with the longitudinal center line between the trunnion bearings 21, the bar 26 will thereafter maintain this parallel relation at all positions due to the parallel action of the links 43 and 48. The movements of the bar 26 will be transmitted to the levers 24 by the pins 29 and 33 traveling in the grooves 30 and 34 in the lever arms.

The pencil plate 38 carries a pencil holder 51 which extends through an elongated slot 52 therein. The slot 52 is parallel to the slots 19 in the table plates 14 and 15 and corresponds in length thereto. The pencil holder may be locked at any desired position in its slot 52 by means of a lock nut 53. The pencil holder is designed to hold either a pencil lead 54 or a prick point, as desired.

A radial arm 55 of transparent plastic or similar material is hingedly supported above the free extremity of the left radial lever 24 upon a supporting hinge post 56, and a similar radial arm 57 is similarly supported on a hinge post 58 from the free extremity of the right radial lever 24.

The radial arms 55 and 57 extend radially inward over the upper surfaces of the photo plates 16 and 17, respectively, to the axis thereof. The axial extremities of these arms are perforated to receive center pins 59 having weighted heads 60. The photo plates 16 and 17 are each provided with two center holes 61 and 62 into which the pins 59 extend. The holes 61 and 62 are spaced apart a distance equal to the length of the slots 19 and 52. Each radial arm 55 and 57 is provided with a longitudinally extending radial line 63 which is printed, marked, or engraved thereon.

The stereoscopic viewing portion of the invention forms no part of the present invention. Any suitable stereoscopic lens and reflecting system may be used. The system illustrated on the drawing is described and illustrated more in detail in Patent No. 2,263,971 which was issued November 25, 1941, and in which the present applicant appears as a co-inventor.

The stereoscopic system is supported on posts 64 which extend upwardly from the pad portions 11. The posts 64 support a pair of parallel bars 65 which extend horizontally across the rear portion of the base plate 10 parallel to the longitudinal axis of the device.

The bars 65 support a pair of adjustable view mirrors 66. The mirrors are mounted on adjustable bracket members 74 which are slidable along the bars 65. The bars 65 also support a stereoscopic eye piece frame 67 which is also slidable along the bars and may be set in any desired position thereon by means of a set screw 68. The frame 67 supports a pair of eye pieces 69 provided with the usual stereoscopic objective lenses and mirrors or prisms for receiving the reflected images from the mirrors 66 and directing them into the eyes of the operator. The frame 67 also carries a pair of adjustable head-supporting cushions 70 against which the forehead of the operator rests while he is looking through the eye pieces 69.

The detail construction and arrangement of parts, of the mirrors 66, the bars 65, the eye pieces 69, and the cushions 70 form no part of the present invention and are described more in detail in the aforementioned prior Patent No. 2,263,971.

*Operation*

A "left" stereoscopic print 71 is placed on the left photo plate 16, and a "right" stereoscopic print 72 is placed on the right photo plate 17. The centers of the respective prints are pierced with the center pins 59 of the radial arms 55 and 57, with the pins entering the pin holes 61 in the photo plates 16 and 17. The prints are revolved until their transverse axes align with an imaginary line drawn through the axes of the center pins and are then fastened to the plates by means of "Scotch" tape tabs 73, or in any other desired manner, so that the radial arms 55 and 57 will move freely over their surfaces.

The photo prints are now viewed through the stereoscopic eye pieces 69, and the optical system is adjusted as usual to bring them into perfect stereoscopic relief. Should the photos be found to be on different scales, the eye piece frame 67 is moved along the bars 65 and set, by means of the set screw 68, to compensate for this condition.

The result is a stereoscopic image of the photographed terrain with the two radial lines 63 superimposed thereon. Since these two lines radiate from different centers, they cross each other, except at the longitudinal axis of the plotter. As the pencil holder 51 is moved, these radial lines pivot about the center pins as control points, and the point of intersection therebetween moves in correspondence with the movements of the pencil.

The plotter is now placed on the base map sheet, and the connecting points are oriented between the stereoscopic image and the map by moving the plotter over the map. Should it be found that the scale of the photographic image differs from the scale of the map, the former can be brought into register with the latter by rotating the nut 35. This swings the radial arms toward or away from each other to change the position of the intersection between the radial lines 63 to correspond to the scale of the map.

When the plotter has been oriented and set to scale with the map, the entire area of the stereoscopic image between the centers may be drawn off on the map by keeping the intersection of the radial lines 63 at the detail to be mapped by the pencil. The detail is drawn on the map to exact scale without further adjustment.

The intersection of the two radial lines is clear and distinct except for a narrow band, approximately ¾" wide at the axis between the centers. In this area, the two lines are so nearly in alignment that it is difficult to accurately locate the exact point of intersection thereof. Therefore, after the entire area has been drawn off on both sides of this narrow band, the center pins 59 are lifted and the photo plates 16 and 17 are shifted forwardly the length of the slots 19 (¾"). The center pins 59 are then inserted through the prints into the second center holes 62. The pencil holder 51 is also shifted forwardly in its slot 52 to re-align the pencil with the map detail, and locked in the new position by the lock nut 53. The plotting is now proceeded with to cover the narrow central band.

The pin block 75 is only used for rough placement of the pencil location and to adjust the latter to the approximate middle of the plotter. The fine scale adjustments are all made with the nut 35.

One of the main advantages of the radial planimetric plotter is its ease of operation. It requires no highly trained operator. Anyone able to see stereoscopically may begin operation at once.

Speed is another big advantage. In comparison with the reflecting projector type, this speed is especially noticeable in hilly or mountainous country, as there is not the necessity of constantly adjusting for scale for the two intersecting lines 63 move on a perfectly level plane over the terrain of the stereoscopic image and measurements on this level plane are not effected by changes in ground elevation. Only a minimum of control is necessary, and the photographs need not be detailed beforehand. The radial planimetric plotter is also faster than floating dot types of plotters because it is not necessary to remove parallax due to tip and tilt.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A planimetric plotting device comprising: two spaced-apart photo plates; an aerial photograph on each plate, said photographs being stereoscopically related; a pivot member mounted at the center of each photograph; a radial arm extending from each pivot member, said arms being rotatable about their pivot members over the surface of said photographs; a line carried by each arm intersecting the pivot thereof; slidable means arranged to move along the axis of each arm; a cross bar connecting the slidable means of one arm to the same means on the other arm, said cross bar having two-dimensional movement; means maintaining said cross bar in fixed relation to a line connecting said centers; a movable map-marking device; and means for transmitting the movements of said marking device to said cross bar.

2. A planimetric plotting device comprising: two spaced-apart photo plates; an aerial photograph on each plate, said photographs being stereoscopically related; a pivot member mounted at the center of each photograph; a radial arm extending from each pivot member, said arms being rotatable about their pivot members over the surface of said photographs; a line carried by each arm intersecting the pivot thereof; slidable means arranged to move along the axis of each arm; a cross bar connecting the slidable means of one arm to the same means on the other arm, said cross bar having two-dimensional movement; means maintaining said cross bar in fixed relation to a line connecting said centers; a movable map-marking device; means for transmitting the movements of said marking device to said cross bar; and means for varying the spacing of said slidable means along said bar.

3. A planimetric plotting device comprising: a first photo plate supporting a left stereoscopic photograph; a second photo table supporting a right stereoscopic photograph; means for stereoscopically viewing the two photographs; a pivot device at the center of each photograph; a radial arm extending from each pivot device over each photograph; a radial lever positioned below each photo plate and below each radial arm, the outer extremity of each lever being connected to the outer extremity of one of said arms, the other extremity of each lever being pivoted on an axis coinciding with the axis of the pivot of its arm; a cross bar extending across both levers; connecting means connecting each lever with said bar, said connecting means being movable longitudinally of said levers; a marking device supported from said cross bar; means for movably supporting said cross bar; and means for maintaining the longitudinal axis of said cross bar parallel with an axis intersecting said two pivot means.

4. A planimetric plotting device comprising: a first photo plate supporting a left stereoscopic photograph; a second photo table supporting a right stereoscopic photograph; means for stereoscopically viewing the two photographs; a pivot device at the center of each photograph; a radial arm extending from each pivot device over each photograph; a radial lever positioned below each photo plate and below each radial arm, the outer extremity of each lever being connected to the outer extremity of one of said arms, the other extremity of each lever being pivoted on an axis coinciding with the axis of the pivot of its arm; a cross bar extending across both levers; connecting means connecting each lever with said bar, said connecting means being movable longitudinally of said levers; a marking device supported from said cross bar; tracks slidably supporting said cross bar so that the latter may move both laterally and longitudinally; and a system of parallel links hingedly connected to said cross bar and acting to maintain said cross bar parallel with an axis intersecting the two pivot means at all positions of movement of said cross bar.

5. A planimetric plotting device comprising: a base member; a left table plate mounted above one extremity of said base member; a right table plate mounted above the other extremity of said base member; a rotatable trunnion bearing mounted below the center of each table plate; a radial lever secured at one extremity to each trunnion bearing and extending radially outward beyond the periphery of each table plate; a cross bar extending across both radial levers; pins carried by said cross bar and slidably engaging said levers; a pencil holder mounted on said cross bar; a radial arm secured to the outer extremity of each lever and extending inwardly over each table plate to a pivotal mounting in alignment with the axis of each trunnion bearing; a radial line on each radial arm; means for slidably supporting said cross arm; and means for maintaining said cross arm parallel with a line intersecting the axes of both said trunnion bearings.

6. A planimetric plotting device comprising: a base member; a left table plate mounted above one extremity of said base member; a right table plate mounted above the other extremity of said base member; a rotatable trunnion bearing mounted below the center of each table plate; a radial lever secured at one extremity to each trunnion bearing and extending radially outward beyond the periphery of each table plate; a cross bar extending across both radial levers; pins carried by said cross bar and slidably engaging said levers; a pencil holder mounted on said cross bar; a radial arm secured to the outer extremity of each lever and extending inwardly over each table plate to a pivotal mounting in alignment with the axis of each trunnion bearing; a radial line on each radial arm; means for slidably supporting said cross arm; means for maintaining said cross arm parallel with a line intersecting the axes of both said trunnion bearings; and means for varying the distance between the pins on said cross arm.

7. A planimetric plotting device comprising: a base member; a left table plate mounted above one extremity of said base member; a right table plate mounted above the other extremity of said base member; a rotatable trunnion bearing mounted below the center of each table plate; a radial lever secured at one extremity to each trunnion bearing and extending radially outward beyond the periphery of each table plate; a cross bar extending across both radial levers; pins carried by said cross bar and slidably engaging said levers; marking means mounted on said cross bar; a photo plate supported by each table plate, each photo plate being provided with a center pin socket; a radial arm hingedly secured to the outer extremity of each radial lever so as to swing over said photo plate; a pivot pin extending through the inner extremity of each radial arm into the pin socket of its respective photo plate; and a radial line carried by each radial arm.

8. A planimetric plotting device comprising: a base member; a left table plate mounted above one extremity of said base member; a right table plate mounted above the other extremity of said base member; a rotatable trunnion bearing mounted below the center of each table plate; a radial lever secured at one extremity to each trunnion bearing and extending radially outward beyond the periphery of each table plate; a cross bar extending across both radial levers; pins carried by said cross bar and slidably engaging said levers; a photo plate supported by each table plate, each photo plate being provided with a center pin socket; a radial arm hingedly secured to the outer extremity of each radial lever so as to swing over said photo plate; a pivot pin extending through the inner extremity of each radial arm into the pin socket of its respective photo plate; a radial line carried by each radial arm; studs extending downward from each photo plate into elongated guide slots in each table plate so that said photo plates may be moved forwardly thereon, said photo plates being provided with a second pin socket for receiving said pin when the photo plates are moved forwardly on said table plates; a pencil plate mounted on said cross bar at the mid-portion of the latter; marking means movably mounted on said pencil plate; and means for securing said marking means at any desired spaced relation with said cross bar.

9. A planimetric plotting device comprising: a base member; a table plate supported above each extremity of said base member; a stereoscopic viewing device supported from said base member above said table plates; a photo plate slidably mounted on each table plate so as to be movable forward and backward thereon; a pair of spaced-apart slide tracks extending transversally across said base member below said table plates; a cross bar lying on said slide tracks; two pairs of parallel links extending from a hinged connection with said cross bar to a hinged connection with said base plate to maintain the former parallel with a longitudinal axis intersecting the centers of the two table plates; a central bearing device mounted below each table plate on said longitudinal axis; a lever extending from each bearing device radially outward beyond the periphery of its respective plate, said levers lying across said cross bar; a hinge post extending upward from the free extremity of each lever; a transparent radial arm extending from each hinge post radially inward to the center of each photo plate; a radial line carried by each arm; a center pin extending through the axis extremity of each arm in a central pin socket in each photo plate; a pencil holder supported from the mid-portion of said cross bar; and means communicating the movements of said cross bar to said levers.

10. A planimetric plotting device comprising: a base member; a table plate supported above each extremity of said base member; a stereoscopic viewing device supported from said base member above said table plates; a photo plate slidably mounted on each table plate so as to be movable forward and backward thereon; a pair of spaced-apart slide tracks extending transversally across said base member below said table plates; a cross bar lying on said slide tracks; two pairs of parallel links extending from a hinged connection with said cross bar to a hinged connection with said base plate to maintain the former parallel with a longitudinal axis intersecting the centers of the two table plates; a central bearing device mounted below each table plate on said longitudinal axis; a lever extending from each bearing device radially outward beyond the periphery of its respective plate, said levers lying across said cross bar; a hinge post extending upward from the free extremity of each lever; a transparent radial arm extending from each hinge post radially inward to the center of each photo plate; a radial line carried by each arm; a center pin extending through the axis extremity of each arm in a central pin socket in each photo plate; a pencil holder supported from the mid-portion of said cross bar; pin-supporting members mounted on said cross bar at the points where the latter intersects said levers; and a pin extending upward from each pin-supporting member into slidable engagement with a longitudinally extending groove in each lever to communicate the movements of said cross bar to said levers.

11. A planimetric plotting device comprising: a base member; a table plate supported above each extremity of said base member; a stereoscopic viewing device supported from said base member above said table plates; a photo plate slidably mounted on each table plate so as to be movable forward and backward thereon; a pair of spaced-apart slide tracks extending transversally across said base member below said table plates; a cross bar lying on said slide tracks; two pairs of parallel links extending from a hinged connection with said cross bar to a hinged connection with said base plate to maintain the former parallel with a longitudinal axis intersecting the centers of the two table plates; a central bearing device mounted below each table plate on said longitudinal axis; a lever extending from each bearing device radially outward beyond the periphery of its respective plate, said levers lying across said cross bar; a hinge post extending upward from the free extremity of each lever; a transparent radial arm extending from each hinge post radially inward to the center of each photo plate; a radial line carried by each arm; a center pin extending through the axis extremity of each arm in a central pin socket in each photo plate; a pencil holder supported from the mid-portion of said cross bar; pin-supporting members mounted on said cross bar at the points where the latter intersects said levers; a pin extending upward from each pin-supporting member into slidable engagement with a longitudinally extending groove in each lever to communicate the movements of said cross bar to said levers, said pin-supporting members being adjustable along said cross bar; and means for setting said pin-supporting members in any desired spaced relation upon said cross bar.

12. A planimetric plotting device comprising: a base member; a table plate supported above each extremity of said base member; a stereoscopic viewing device supported from said base member above said table plates; a photo plate slidably mounted on each table plate so as to be movable forward and backward thereon; a pair of spaced-apart slide tracks extending transversally across said base member below said table plates; a cross bar lying on said slide tracks; two pairs of parallel links extending from a hinged connection with said cross bar to a hinged connection with said base plate to maintain the former parallel with a longitudinal axis intersecting the centers of the two table plates; a central bearing device mounted below each table plate on said longitudinal axis; a lever extending from each bearing device radially outward beyond the periphery of its respective plate, said levers lying across said cross bar; a hinge post extending upward from the free extremity of each lever; a transparent radial arm extending from each hinge post radially inward to the center of each photo plate; a radial line carried by each arm; a center pin extending through the axis extremity of each arm in a central pin socket in each photo plate; a pencil plate pivotally mounted on said cross bar intermediate the extremities of the latter, said pencil plate being hingedly connected to one of said pairs of parallel links and acting to connect the latter to said cross bar; means for securing said pencil plate to said cross bar at a position relative to its pivot to align the cross bar with the longitudinal axis; a pencil holder vertically supported by said pencil plate; and means carried by said cross bar and slidably engaging said levers and acting to transmit the movements of the former to the latter.

13. In a planimetric plotting device of the type having means for supporting right and left stereoscopic photographs in side-by-side relation before a stereoscopic viewer, means for locating points on a map positioned between said photographs by triangulation from control points on said photographs, comprising: a radial lever pivoted at the control point of each photograph; a cross bar extending between the two levers; connecting means connecting each lever with said cross bar, said connecting means being freely movable along the length of each lever; a fixed support; a series of hinged, parallel links extending from said support to a connection with said cross bar and acting to maintain said cross bar in fixed relation with a line connecting said control points, said bar being otherwise freely movable in all directions in a common plane; map-marking means supported from said bar over said map; and means for varying the distance between said marking means and said connecting means.

14. In a planimetric plotting device of the type having means for supporting right and left stereoscopic photographs in side-by-side relation before a stereoscopic viewer, means for locating points on a map positioned between said photographs by triangulation from control points on said photographs, comprising: a radial lever pivoted at the control point of each photograph; a cross bar extending between the two levers; connecting means connecting each lever with said cross bar, said connecting means being freely movable along the length of each lever; a fixed support; a series of hinged, parallel links extending from said support to a connection with said cross bar and acting to maintain said cross bar in fixed relation with a line connecting said control points, said bar being otherwise freely movable in all directions in a common plane; map-marking means supported from said bar over said map; means for varying the distance between said marking means and said connecting means; and means for varying the angular relation between said bar and said line connecting the control points.

PHILIP B. KAIL.

REFERENCES CITED

The following references are of record in the file of this patent:

UNITED STATES PATENTS

| Number | Name | Date |
|---|---|---|
| 1,090,493 | Von Orel | Mar. 17, 1914 |
| 1,827,551 | Wulkow | Oct. 13, 1931 |
| 2,044,114 | Bagley | June 16, 1936 |
| 2,152,309 | Von Gruber | Mar. 28, 1939 |
| 2,196,723 | Corlett | Apr. 9, 1940 |